(12) United States Patent
Shinoda

(10) Patent No.: US 11,993,962 B2
(45) Date of Patent: May 28, 2024

(54) CABLE MODULE, VEHICLE, AND METHOD OF PRODUCING VEHICLE

(71) Applicants: TOYOTA JIDOSHA KABUSHIKI KAISHA, Aichi-ken (JP); SUBARU CORPORATION, Tokyo (JP)

(72) Inventor: Yoshinori Shinoda, Toyohashi (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 139 days.

(21) Appl. No.: 17/686,302

(22) Filed: Mar. 3, 2022

(65) Prior Publication Data

US 2022/0307294 A1    Sep. 29, 2022

(30) Foreign Application Priority Data

Mar. 26, 2021  (JP) .................................. 2021-053871

(51) Int. Cl.
| | |
|---|---|
| *E05B 79/20* | (2014.01) |
| *E05B 79/02* | (2014.01) |
| *E05B 81/90* | (2014.01) |
| *E05B 83/34* | (2014.01) |
| *B60L 53/16* | (2019.01) |

(52) U.S. Cl.
CPC ............. *E05B 79/02* (2013.01); *E05B 79/20* (2013.01); *E05B 81/90* (2013.01); *E05B 83/34* (2013.01); *B60L 53/16* (2019.02)

(58) Field of Classification Search
CPC .......... E05B 79/00; E05B 79/02; E05B 79/06; E05B 79/10; E05B 79/20; E05B 79/22; Y10T 74/20402; Y10T 74/2042; Y10T 74/20426; Y10T 74/2045; Y10T 74/20462; Y10S 292/16
See application file for complete search history.

(56) References Cited

U.S. PATENT DOCUMENTS

| | | | | |
|---|---|---|---|---|
| 8,317,237 | B1 * | 11/2012 | Fannon ................... | E05B 79/20 |
| | | | | 292/336.5 |
| 11,555,339 | B2 * | 1/2023 | Tamura ................... | E05B 79/20 |
| 2004/0163487 | A1 * | 8/2004 | Martus .................... | E05B 79/20 |
| | | | | 74/502.2 |

(Continued)

FOREIGN PATENT DOCUMENTS

| | | |
|---|---|---|
| JP | 2017155520 A | 9/2017 |
| JP | 2017212133 A | 11/2017 |

*Primary Examiner* — Alyson M Merlino
(74) *Attorney, Agent, or Firm* — HAUPTMAN HAM, LLP

(57) ABSTRACT

A cable module includes a retaining member and a cable member. The retaining member includes a base portion, a guide portion, and an attaching portion. The cable member placed on the base portion includes a grip portion and a cable. The guide portion configured to guide the cable is provided on a surface of the base portion. The attaching portion protrudes from the base portion. The retaining member is configured to retain the cable member in a first position and a second position. The length of an intermediate portion of the cable located between the guide portion and the grip portion when the cable member is in the second position is longer than that when the cable member is in the first position. When the cable member is in the second position, the grip portion is attached onto the attaching portion in a condition where the intermediate portion is bent.

13 Claims, 9 Drawing Sheets

(56) References Cited

U.S. PATENT DOCUMENTS

| | | | |
|---|---|---|---|
| 2005/0099021 A1* | 5/2005 | Jinzu | E05B 83/26 |
| | | | 292/336.3 |
| 2012/0074714 A1* | 3/2012 | Saccon | E05C 7/04 |
| | | | 292/164 |
| 2013/0040486 A1* | 2/2013 | Kurumizawa | B60L 53/16 |
| | | | 439/350 |
| 2019/0234119 A1* | 8/2019 | Miwa | E05B 85/10 |
| 2022/0074241 A1* | 3/2022 | Kubo | E05B 79/20 |
| 2022/0136289 A1* | 5/2022 | Guerin | E05B 79/20 |
| | | | 70/279.1 |

* cited by examiner

CABLE MODULE, VEHICLE, AND METHOD OF PRODUCING VEHICLE

CROSS-REFERENCE TO RELATED APPLICATION

This application claims priority to Japanese Patent Application No. 2021-053871 filed on Mar. 26, 2021, incorporated herein by reference in its entirety.

BACKGROUND

1. Technical Field

The technology disclosed in the specification relates to a cable module, a vehicle including the cable module, and a method of producing the vehicle.

2. Description of Related Art

A connecting mechanism that connects a charging connector to an inlet for charging installed on a vehicle is disclosed in Japanese Unexamined Patent Application Publication No. 2017-212133 (JP 2017-212133 A). The connecting mechanism has an electronic lock device that locks the charging connector to the inlet. The electronic lock device normally performs locking and unlocking by use of driving force of a motor. Also, the electronic lock device has a releasing part. When the operator pulls the releasing part, the lock established by the electronic lock device is released, and the charging connector can be detached from the inlet. Thus, in the electronic lock device, the lock can be manually released.

SUMMARY

In the electronic lock device in which the lock is released when the operator pulls the releasing part, the releasing part may be in the form of a cable. When the releasing part is in the form of the cable, there is a need to reduce slack of the cable. This is because the lock may not be appropriately released if slack of the cable is large. On the other hand, when the electronic lock device is installed, it is difficult to connect the cable to the electronic lock device if slack of the cable is small. In the specification, a cable module that can connect the cable to the electronic lock device while curbing slack of the cable, a vehicle including the cable module, and a method of producing the vehicle, are proposed.

An aspect of the present disclosure is a cable module that is connected to a manually releasing part of an electronic lock device. The cable module includes a retaining member and a cable member. The retaining member includes a base portion, a guide portion, and an attaching portion. The cable member is placed on the base portion. The cable member includes a grip portion and a cable connected to the grip portion. The guide portion is provided on an upper surface of the base portion, and is configured to guide the cable such that the cable member slides relative to the base portion along a longitudinal direction of the cable. The attaching portion protrudes from the base portion. The retaining member is configured to retain the cable member in a first position and a second position. A length of an intermediate portion of the cable located between the guide portion and the grip portion when the cable member is in the second position is longer than that of the intermediate portion when the cable member is in the first position. When the cable member is in the second position, the grip portion is attached onto the attaching portion in a condition where the intermediate portion is bent.

In the first position, the length of the intermediate portion may be zero.

When the cable module is connected to the electronic lock device, the retaining member may be initially fixed in position. For example, when the cable module is connected to the electronic lock device installed on the vehicle, the retaining member may be fixed to the vehicle body. Then, in a condition where the retaining member retains the cable member in the first position, the cable may be connected to the manually releasing part of the electronic lock device. When the cable member is in the first position, the length of the intermediate portion of the cable located between the guide portion and the grip portion is short; therefore, the length of the cable from the guide portion to the distal end is long. This makes it easy to connect the cable to the manually releasing part of the electronic lock device. At this stage, the cable connected to the manually releasing part is slack. Then, slack of the cable may be reduced by pulling the grip portion. When the grip portion is pulled, the length of the intermediate portion of the cable is increased. Then, the intermediate portion having the increased length may be bent, and the grip portion may be attached onto the attaching portion. In this manner, the cable member may be retained in the second position. With the cable member thus retained in the second position, the cable member can be fixed in a condition where slack of the cable is small. Also, in the second position, the cable member may be held in a bent state; therefore, lateral space occupied by the cable member is small. Thus, the cable member is less likely or unlikely to interfere with another member. Thus, the cable module is readily used even when there is a limitation to the installation space in the lateral direction.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
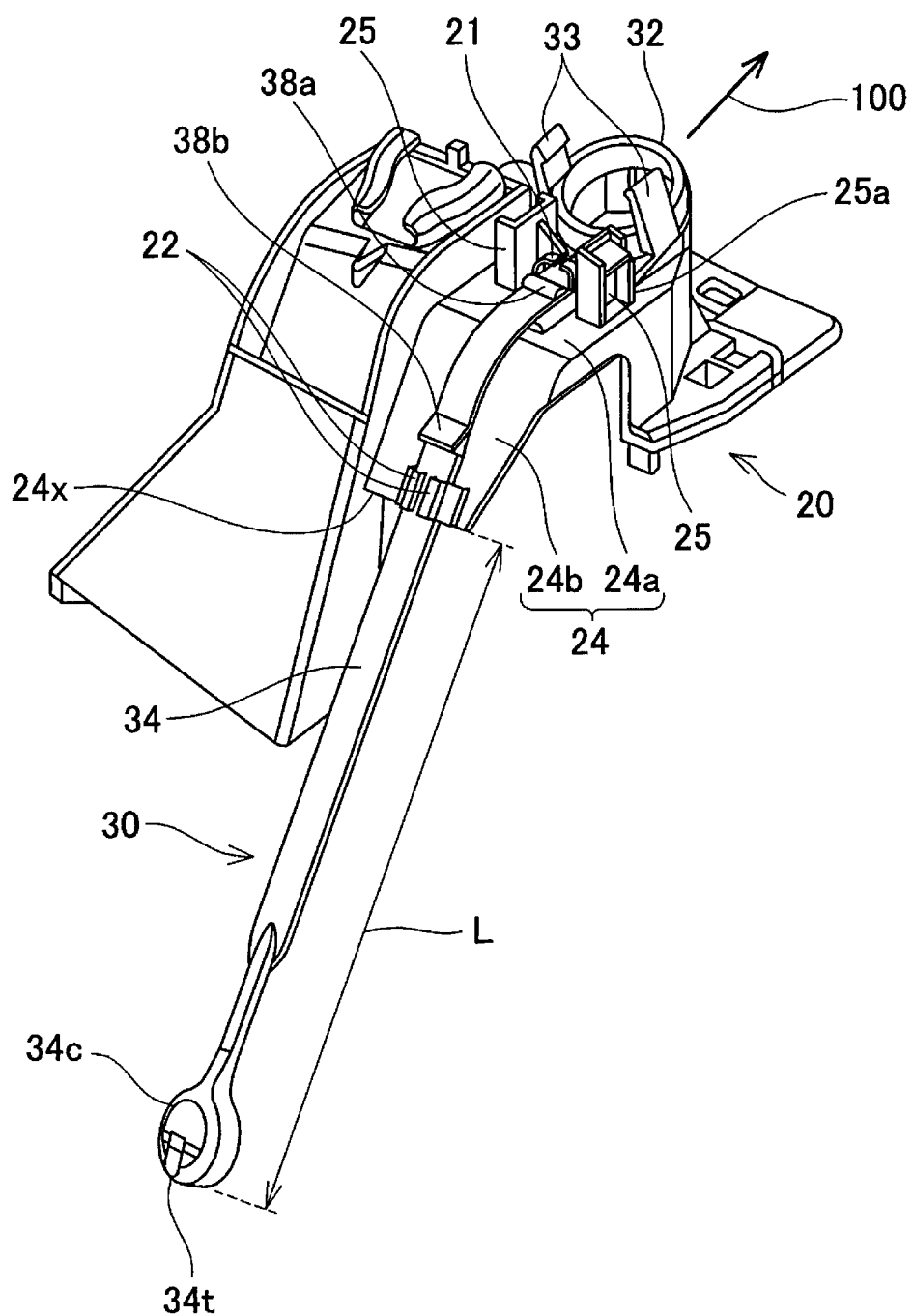
FIG. 1 is a perspective view of a cable module when a cable member is in a first position.

In the cable module of one example disclosed in the specification, the guide portion may include projections provided on the upper surface of the base portion, at positions on opposite sides of the cable.

In the cable module of one example disclosed in the specification, when the cable member is in the first position, the grip portion of the cable member may be in contact with a side face of the attaching portion of the retaining member.

In the cable module of one example disclosed in the specification, a pair of protrusions may be provided on the upper surface of the base portion. When the cable member is in the second position, the intermediate portion that is in a bent state may be located between the pair of protrusions.

With this arrangement, the positional relationship between the intermediate portion in the bent state and the pair of protrusions makes it easier to determine whether the cable member is located in a proper position.

In the cable module of one example disclosed in the specification, each of the protrusions may include an inclined face that is inclined to be closer to the upper surface of the base portion in a direction toward the guide portion. When the cable member is in the first position, the cable member may be retained by the retaining member in a condition where the grip portion is in contact with the inclined face of each of the protrusions.

With this arrangement, when the cable member is in the first position, the grip portion may be held in an inclined state relative to the upper surface of the base portion. This makes it easy to pull the grip portion.

In the cable module of one example disclosed in the specification, the guide portion may include an opposed portion that is opposed to an upper face of the cable. The upper face of the cable may include a first raised portion configured to pass the guide portion.

With this arrangement, when the operator pulls the grip portion, and the first raised portion passes the guide portion, vibration is transmitted to the operator. This makes it easy for the operator to confirm that appropriate operation is being carried out.

In the cable module of one example disclosed in the specification, the upper face of the cable may include a second raised portion configured not to pass the guide portion. The second raised portion may be located closer to a distal end of the cable than the first raised portion.

With this arrangement, the grip portion is less likely or unlikely to be pulled more than necessary.

In the cable module of one example disclosed in the specification, an amount of protrusion of the second raised portion from the upper face of the cable may be larger than an amount of protrusion of the first raised portion from the upper face of the cable.

In the specification, a vehicle including the cable module is also proposed. The vehicle may include a vehicle body, an inlet, a lid that covers the inlet, and a power supply unit electronic lock device configured to lock the inlet or the lid. The retaining member may be fixed to the vehicle body. The cable may be connected to the manually releasing part of the power supply unit electronic lock device. The retaining member may retain the cable member in the second position.

In this vehicle, the cable is connected to the manually releasing part of the power supply port electronic lock device, in a condition where slack of the manually releasing part is small. This makes it easy to pull the cable, and release the lock established by the power supply unit electronic lock device.

In the specification, a method of producing the vehicle is also proposed. The method of producing the vehicle may include fixing the retaining member to the vehicle body, connecting the cable to the manually releasing part of the power supply unit electronic lock device, in a condition where the retaining member retains the cable member in the first position, and moving the cable member from the first position to the second position by pulling the grip portion, after connecting the cable to the manually releasing part of the power supply unit electronic lock device.

According to the method of producing the vehicle, the cable can be connected to the power supply unit electronic lock device, in a condition where the cable is slack. Also, the cable member is moved to the second position, after connection of the cable, so that slack of the cable can be reduced.

Figure 2:
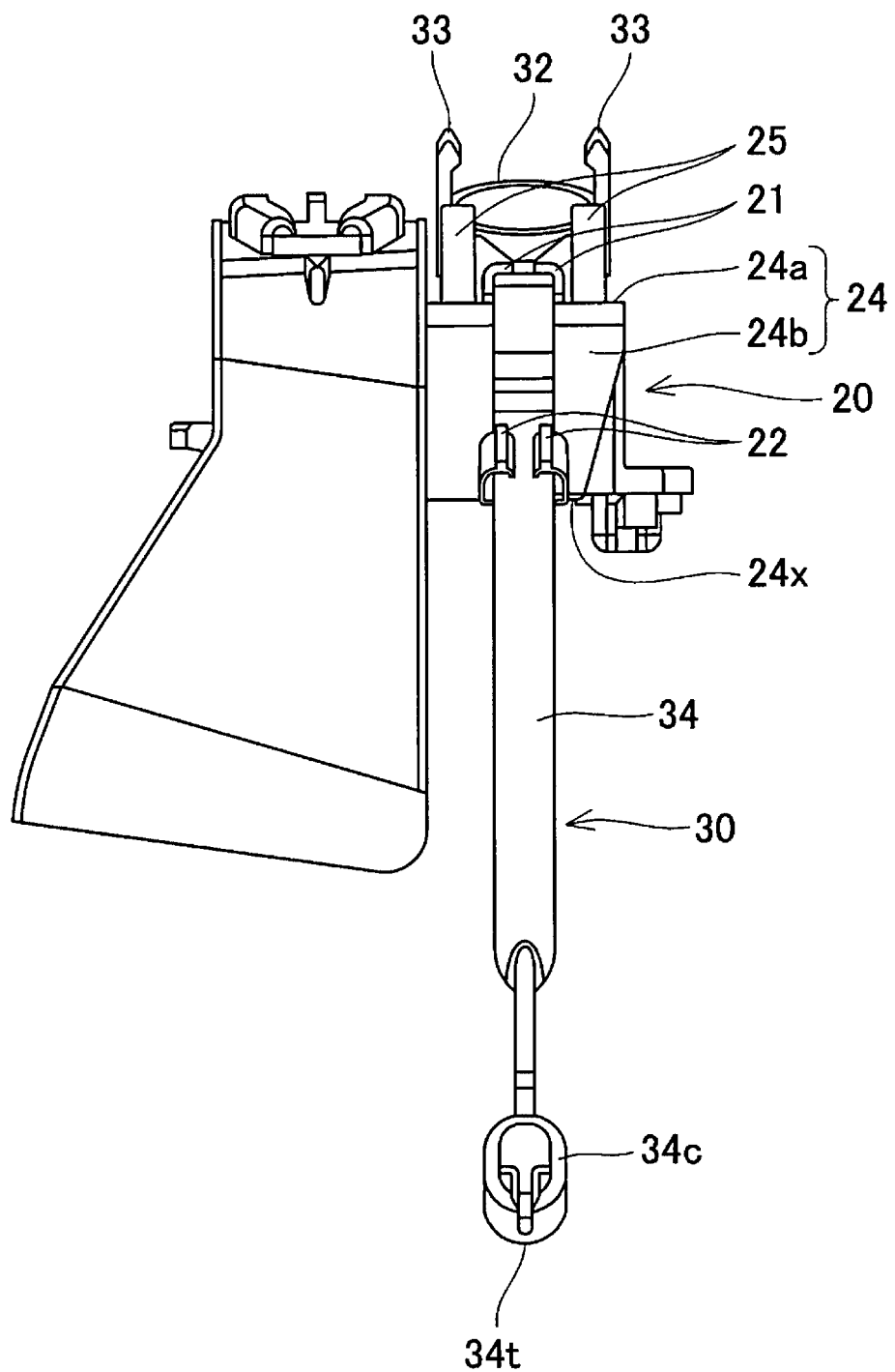
FIG. 2 is a front view of the cable module when the cable member is in the first position.
Figure 3:
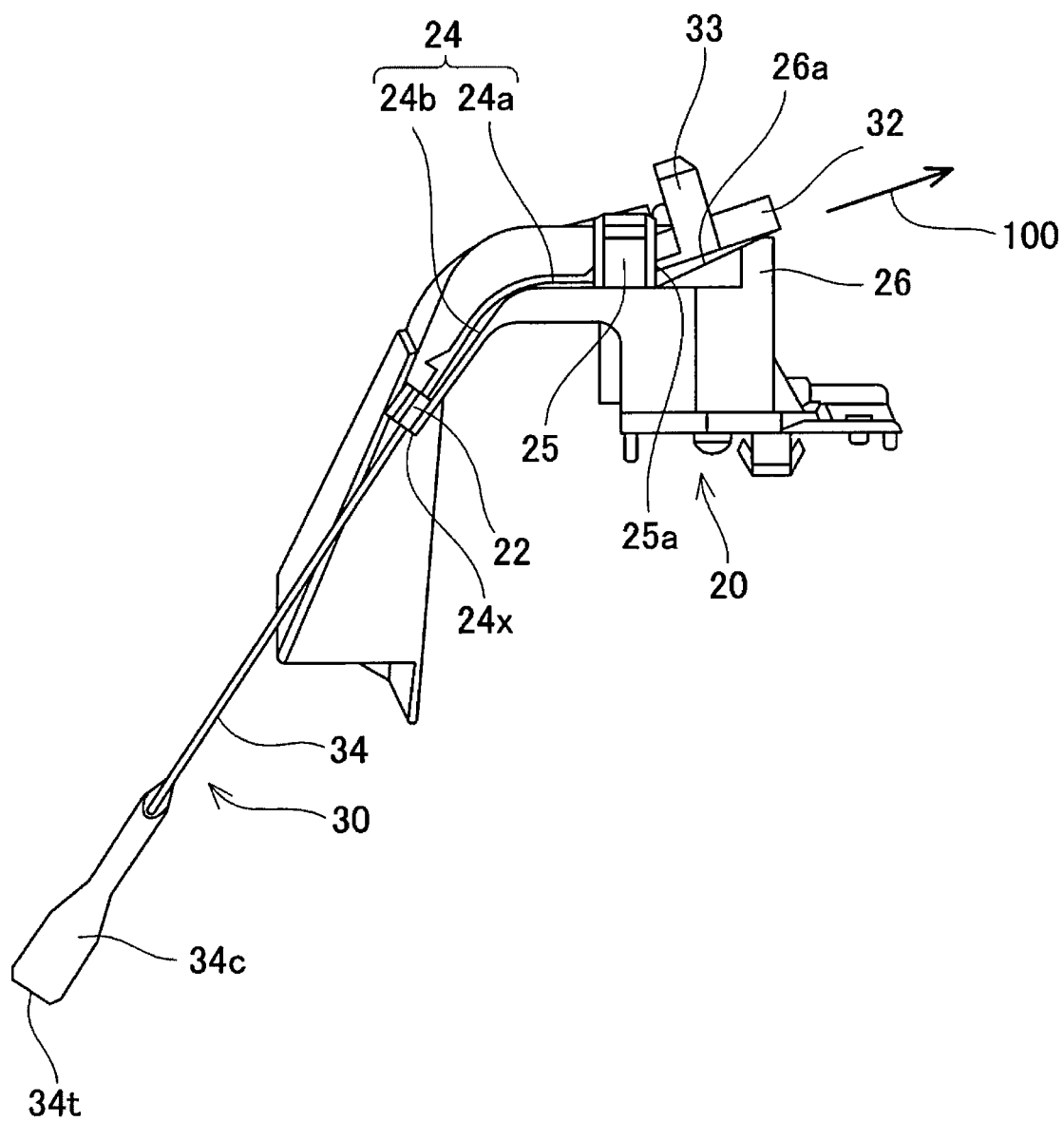
FIG. 3 is a side view of the cable module when the cable member is in the first position.
Figure 8:
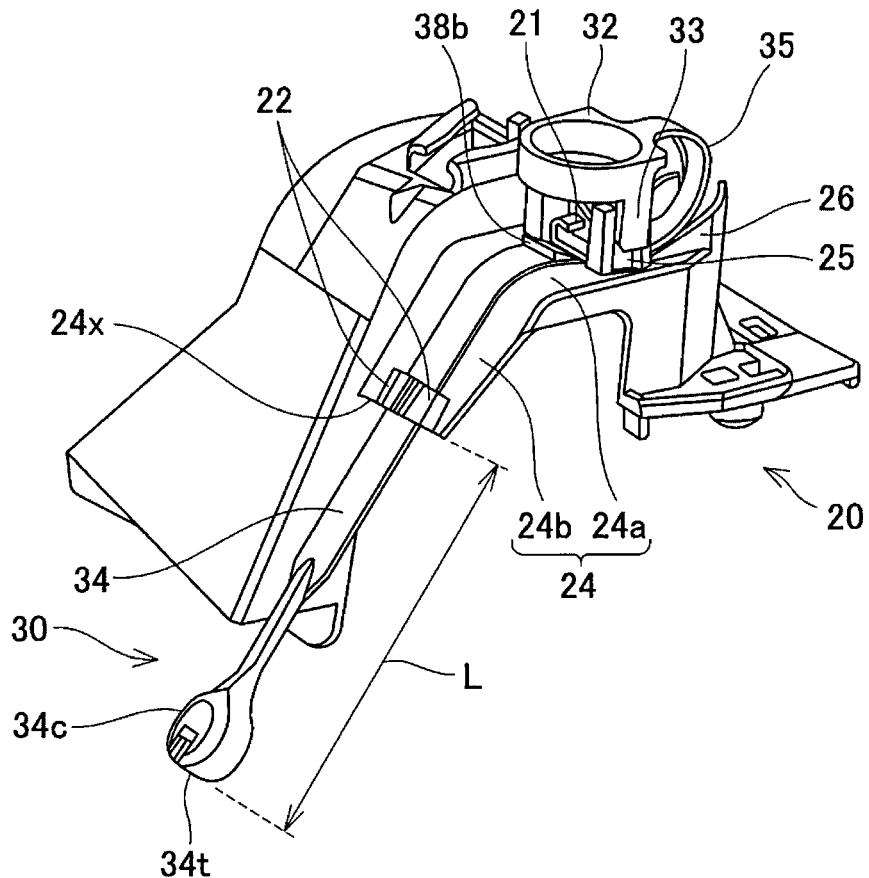
FIG. 8 is a perspective view of the cable module when the cable member is in the second position.

A cable module 10 of one embodiment shown in FIG. 1 to FIG. 3 includes a retaining member 20 and a cable member 30. The cable member 30 is entirely formed of resin. The cable member 30 is retained by the retaining member 20. The cable member 30 can move relative to the retaining member 20. FIG. 1 to FIG. 3 show a first position of the cable member 30. FIG. 8 shows a second position of the cable member 30. The cable member 30 can move between the first position and the second position.

As shown in FIG. 1 to FIG. 3, the cable member 30 includes a grip portion 32, engaging portion 33, and cable 34. The grip portion 32 is shaped like a ring in which a human finger can be inserted. The engaging portion 33 consists of a pair of protrusions that protrudes from the grip portion 32. A hook portion is provided at a distal end of each of the protrusions that constitute the engaging portion 33. When the cable member 30 is in the first position, each of the protrusions that constitute the engaging portion 33 protrudes upward from the grip portion 32. The engaging portion 33 is shaped such that it can engage with an attaching portion 25 that will be described later. The cable 34 is connected to the grip portion 32. The cable 34 has flexibility. The cable 34 is provided at its distal end 34t (an end portion of the cable 34 opposite to the grip portion 32) with a coupling portion 34c to which another member can be coupled.

The retaining member 20 includes a base portion 24, first guide portion 21, second guide portion 22, and attaching portion 25.

The upper surface of the base portion 24 includes a horizontal surface 24a that extends generally horizontally, and a slant surface 24b that is inclined and extends. The slant surface 24b extends obliquely downward from the horizontal surface 24a. The cable member 30 is placed on the base portion 24. When the cable member 30 is in the first position, the grip portion 32 is placed on the horizontal surface 24a, and the cable 34 that extends from the grip portion 32 extends from above the horizontal surface 24a to above the slant surface 24b. The cable 34 extends outward, beyond a lower end 24x of the slant surface 24b. As shown in FIG. 1, when the cable member 30 is in the first position, the length L of a portion of the cable 34 located on the outer side of the lower end 24x is long.

The first guide portion 21 is provided on the horizontal surface 24a. The first guide portion 21 includes projections provided on the opposite sides of the cable 34. Namely, the cable 34 is inserted between a pair of projections included in the first guide portion 21. A distal end portion of each projection of the first guide portion 21 is bent toward the center of the cable 34, and is opposed to the upper face of the cable 34. The second guide portion 22 is provided on the slant surface 24b. The second guide portion 22 includes projections provided on the opposite sides of the cable 34. Namely, the cable 34 is inserted between a pair of projections included in the second guide portion 22. A distal end portion of each projection of the second guide portion 22 is bent toward the center of the cable 34, and is opposed to the upper face of the cable 34. The first guide portion 21 and the second guide portion 22 permit the cable 34 to slide in the longitudinal direction, and restricts lateral and vertical movements of the cable 34.

Figure 4:
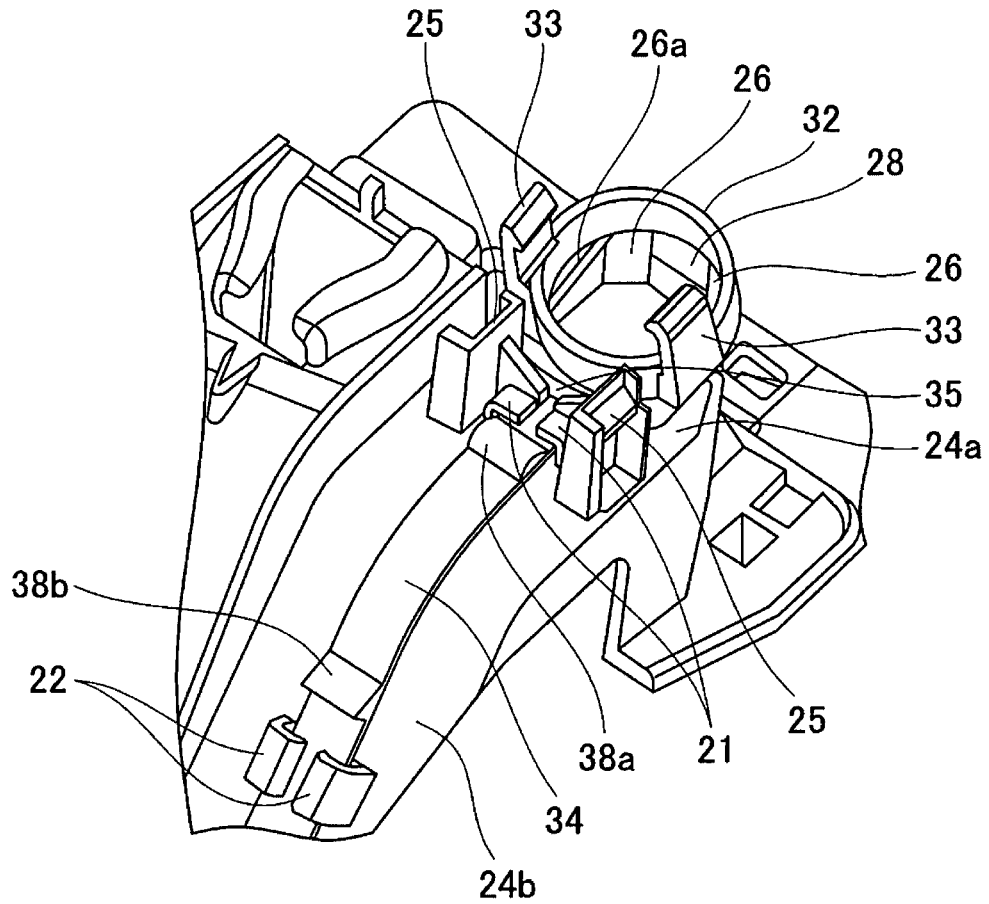
FIG. 4 is an enlarged perspective view of a grip portion and its surrounding members when the cable member is in the first position.
Figure 5:
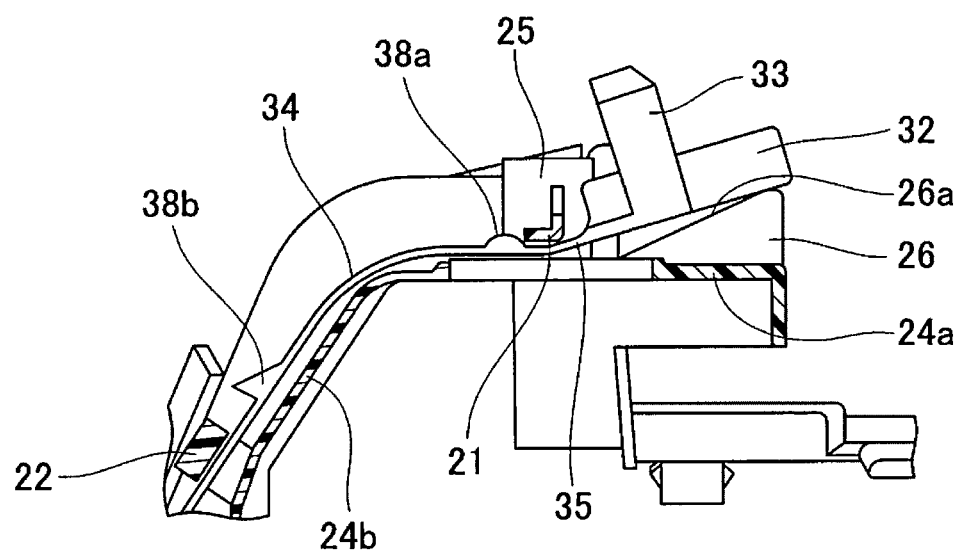
FIG. 5 is a cross-sectional view of a retaining member in a plane cut along a longitudinal direction of a cable.

As shown in FIG. 4 and FIG. 5, a first raised portion 38a and a second raised portion 38b are provided on the upper face of the cable 34. The first raised portion 38a is located at a position closer to the grip portion 32 than the second raised portion 38b. The amount of protrusion of the second raised portion 38b from the upper face of the cable 34 is larger than that of protrusion of the first raised portion 38a from the upper face of the cable 34. When the cable member 30 is in the first position, the first raised portion 38a and second raised portion 38b are located between the first guide portion 21 and the second guide portion 22.

As shown in FIG. 1 to FIG. 3, the attaching portion 25 is provided on the horizontal surface 24a. The attaching portion 25 includes protrusions that are provided on the opposite sides of the cable 34, and protrude from the horizontal surface 24a. Each of the protrusions included in the attaching portion 25 is located at a position adjacent to the first guide portion 21. Each protrusion of the attaching portion 25 extends from the horizontal surface 24a to an upper level than the first guide portion 21. A hook portion is provided at the upper end of each protrusion of the attaching portion 25. The attaching portion 25 is shaped such that it can engage with the engaging portion 33 of the cable member 30. When the cable member 30 is in the first position, the grip portion 32 is in contact with side faces 25a of the protrusions of the attaching portion 25. In other words, the grip portion 32 is in contact with the side faces 25a of the attaching portion 25, so that the cable member 30 is positioned in the first position. Thus, since the grip portion 32 is in contact with the side faces 25a of the attaching portion 25, the cable member 30 is stably held in the first position.

As shown in FIG. 4, a pair of walls 26 is mounted on the horizontal surface 24a. The wall 26 of the embodiment may be regarded as the protrusion of the present disclosure. The walls 26 are provided on the horizontal surface 24a, to be located closer to the grip portion 32 (more specifically, the grip portion 32 when it is in the first position) than to the first guide portion 21 and the attaching portion 25. The walls 26 are provided at the opposite sides of a gap portion 28 provided on an extension of the cable 34. As shown in FIG. 4 and FIG. 5, each of the walls 26 includes an inclined face 26a that is inclined so as to be closer to the horizontal surface 24a in a direction toward the first guide portion 21. When the cable member 30 is in the first position, the lower face of the grip portion 32 is in contact with the inclined faces 26a of the respective walls 26. Thus, the grip portion 32 is obliquely held on the horizontal surface 24a. As a result, a gap is secured between the grip portion 32 and the horizontal surface 24a.

As shown in FIG. 4 and FIG. 5, when the cable member 30 is in the first position, the length of a portion (which will be called "intermediate portion 35") of the cable 34 located between the grip portion 32 and the first guide portion 21 is considerably short.

Figure 6:
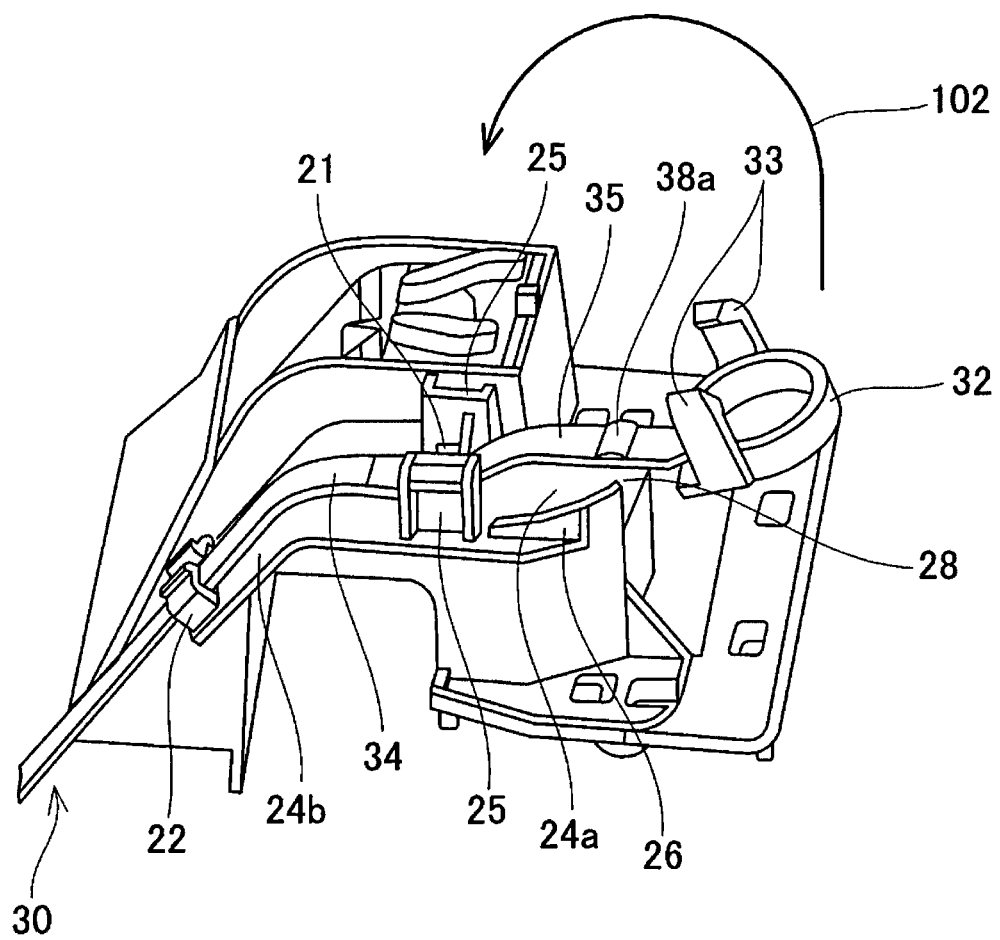
FIG. 6 is a view useful for describing operation to bend the cable member.

As described above, the cable member 30 can move between the first position and the second position. The operation to move the cable member 30 from the first position to the second position will be described. To move the cable member 30 from the first position, the operator initially hooks the ring-shaped grip portion 32 with his/her finger. At this time, the grip portion 32 is inclined relative to the horizontal surface 24a, and a gap exists between the grip portion 32 and the horizontal surface 24a; therefore, the operator can easily engage his/her finger with the grip portion 32. Next, the operator pulls the grip portion 32 in a direction indicated by arrow 100 in FIG. 1 and FIG. 3. Then, the cable member 30, which is guided by the first guide portion 21 and the second guide portion 22, moves along the longitudinal direction of the cable 34. As a result, the cable member 30 as a whole moves toward the grip portion 32, as shown in FIG. 6. Since the gap portion 28 between the walls 26 is located on the extension of the cable 34, the cable 34 is prevented from interfering with the walls 26, when the cable member 30 is moved as shown in FIG. 6. Accordingly, the cable member 30 can be easily moved. As the cable member 30 is moved as shown in FIG. 6, the length of the intermediate portion 35 of the cable 34 between the grip portion 32 and the first guide portion 21 is increased, as compared with that before the movement of the cable member 30.

In this connection, since the amount of protrusion of the first raised portion 38a from the upper surface of the cable 34 is small, the first raised portion 38a can pass the first guide portion 21. When the first raised portion 38a passes the first guide portion 21, vibration is transmitted to the operator. In this manner, the operator can confirm that the operation to move the cable member 30 is appropriately performed. Also, since the amount of protrusion of the second raised portion 38b from the upper surface of the cable 34 is large, the second raised portion 38b cannot pass the first guide portion 21. In this manner, the cable member 30 is prevented from moving excessively.

Figure 7:
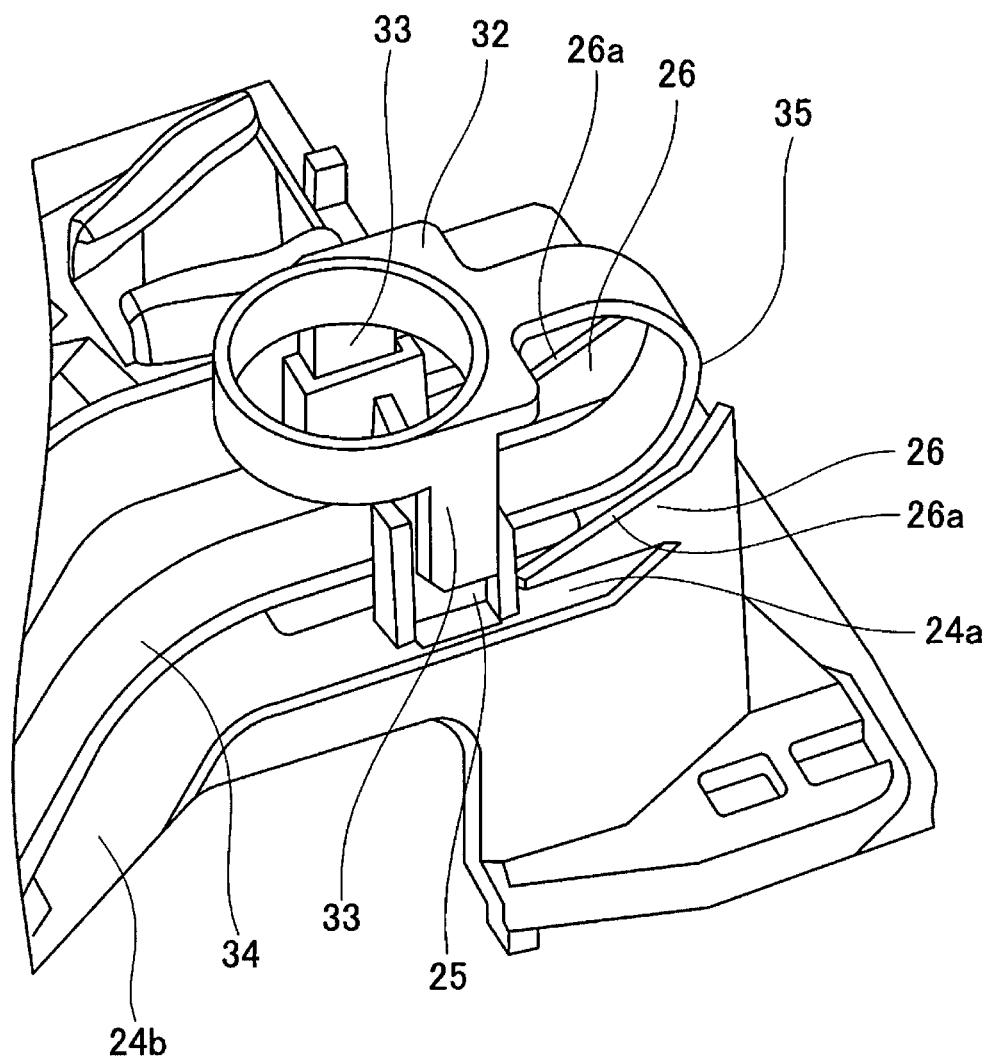
FIG. 7 is an enlarged perspective view of the grip portion and its surrounding members when the cable member is in a second position.

Next, the operator moves the grip portion 32 to above the attaching portion 25 while curving the intermediate portion 35, as indicated by arrow 102 in FIG. 6. More specifically, the operator moves the grip portion 32 to above the attaching portion 25, such that the engaging portion 33 that protrudes from the grip portion 32 faces downward. Next, the grip portion 32 is pressed against the attaching portion 25. Then, the engaging portion 33 engages with the attaching portion 25, as shown in FIG. 7. More specifically, each of the hook portions of the engaging portion 33 engages with a corresponding one of the hook portions of the attaching portion 25. Thus, the grip portion 32 is fixed to the attaching portion 25. The grip portion 32 is fixed right above the first guide portion 21. With the grip portion 32 thus fixed to the attaching portion 25, the cable member 30 is held in the second position shown in FIG. 8. In the condition where the cable member 30 is in the second position, the length L of a portion of the cable 34 located on the outer side of the lower end 24x of the slant surface 24b is short. Namely, in FIG. 8, the length L is shorter than that of FIG. 1. Thus, the length L is reduced, as the cable member 30 is moved from the first position to the second position. Also, as the cable member 30 is moved from the first position to the second position, the length of the intermediate portion 35 of the cable 34 between the grip portion 32 and the first guide portion 21 is increased.

Figure 9:
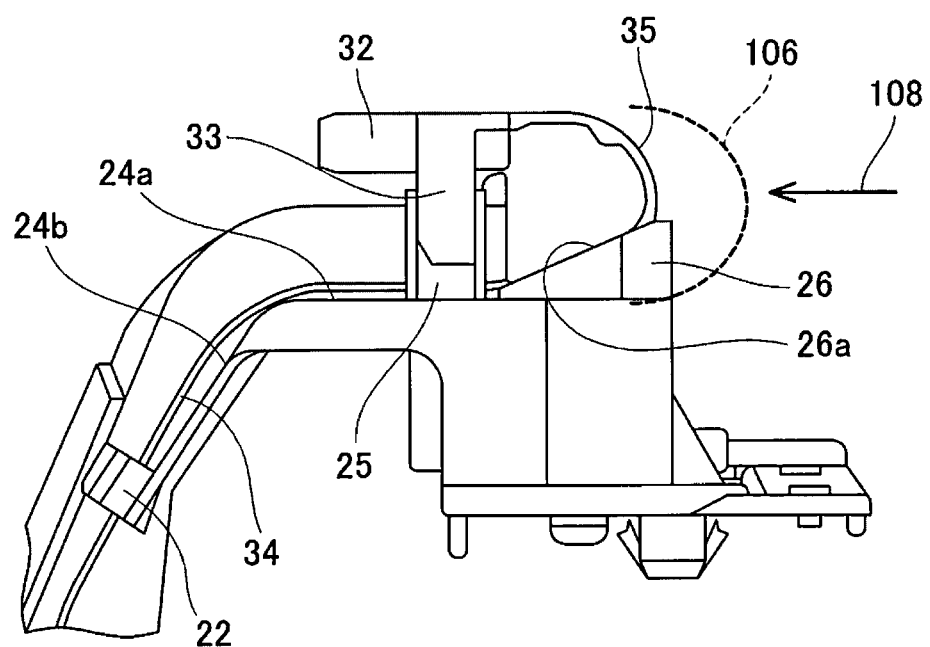
FIG. 9 is an enlarged side view of the grip portion and its surrounding members when the cable member is in the second position.

In the second position, the loop of the intermediate portion 35 of the cable 34 is located between the walls 26. The proper position of the cable member 30 in the second position is set to a position where the loop of the intermediate portion 35 of the cable 34 does not extend beyond the walls 26, as shown in FIG. 9. Accordingly, when the loop of the intermediate portion 35 extends beyond the walls 26, as indicated by a broken line 106 in FIG. 9, the cable member 30 is not placed in the proper position of the second position. The operator can determine whether the cable member 30 is placed in the proper position of the second position, by visually checking the positional relationship between the walls 26 and the loop of the intermediate portion 35. When the loop of the intermediate portion 35 extends beyond the walls 26 as indicated by the broken line 106, the operator pushes the loop of the intermediate portion 35 with his/her finger from the outer side, as indicated by arrow 108, so that the cable member 30 can be moved to the proper position.

Figure 10:
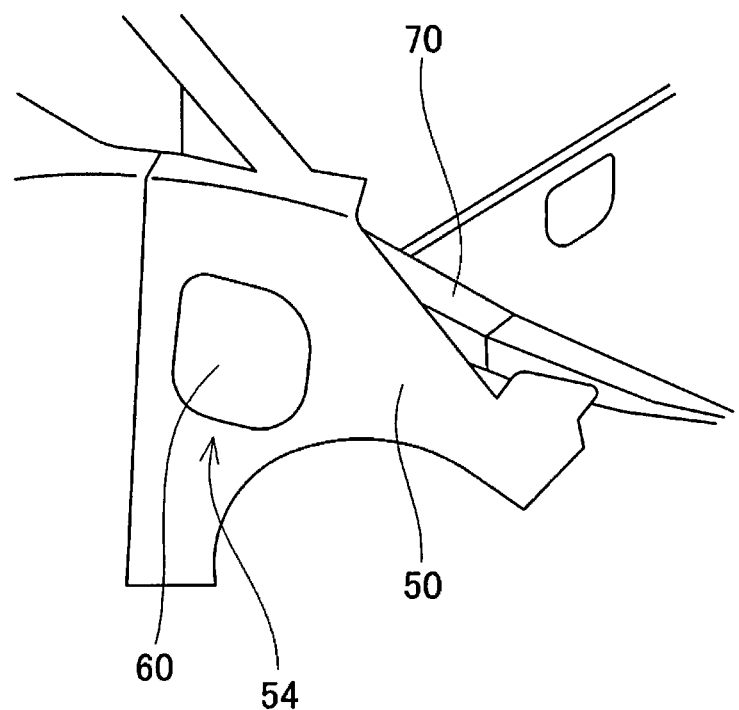
FIG. 10 is a perspective view of a front fender.

Next, a vehicle on which the cable module 10 is mounted will be described. The cable module 10 is mounted on a vehicle that incorporates a battery, and travels using electric power of the battery. The vehicle may be an electric vehicle, or a hybrid vehicle. As shown in FIG. 10, a power supply port 54 is provided in a front fender 50 of the vehicle. An inlet for power feeding is provided within the power supply port 54. The power supply port 54 is covered with a lid 60. The lid 60 is pivotably attached to the front fender 50. The power supply port 54 can be opened and closed with the lid 60. When the lid 60 is opened, and a charging connector is connected from the outside to the inlet, the battery of the vehicle can be charged with power.

Figure 11:
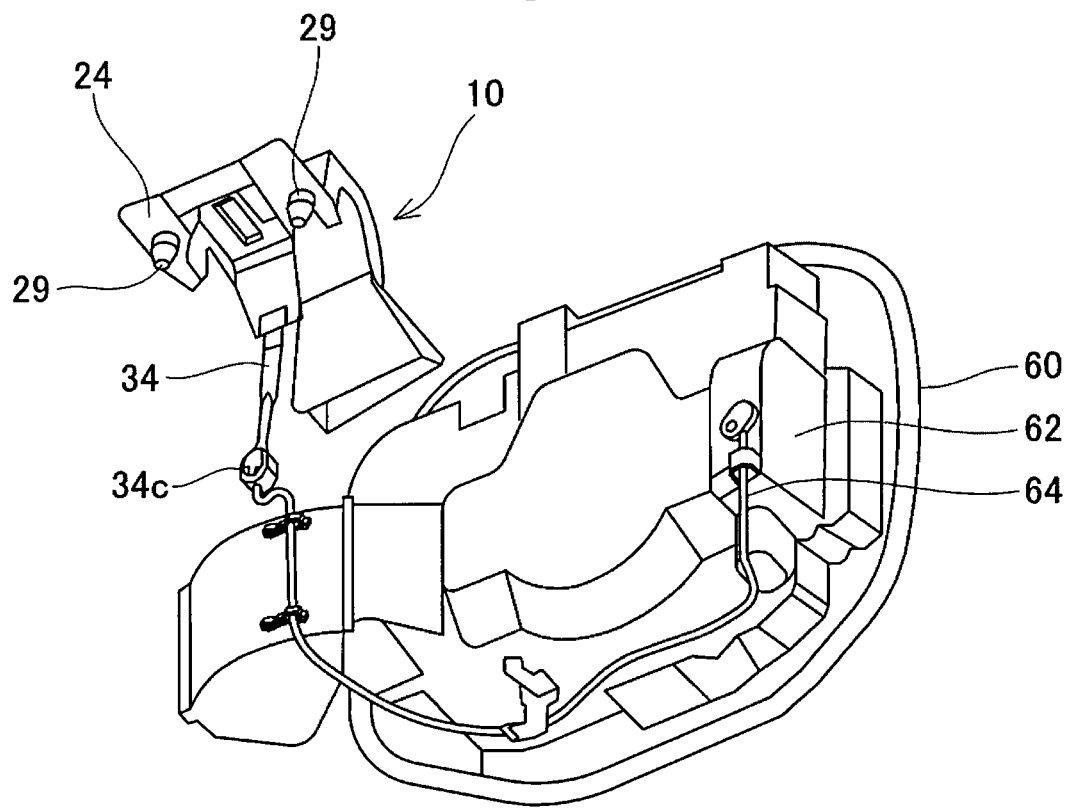
FIG. 11 is a perspective view of a lid as seen from the rear side.

FIG. 11 shows the lid 60 as seen from the rear side. An electronic lock device 62 is installed on the lid 60. The electronic lock device 62 locks and unlocks the lid 60, by operating an actuator (such as a motor) incorporated therein. When the lid 60 is closed, the electronic lock device 62 is automatically operated, so that the lid 60 is locked. Namely, the lid 60 is inhibited from being opened. When certain operation is performed in the vehicle, the lock established by the electronic lock device 62 is released, and the lid 60 is opened. The electronic lock device 62 includes a wire 64. When the wire 64 is pulled in a condition where the electronic lock device 62 is in the locking state, it is possible to release the lock by the electronic lock device 62, without operating the actuator. Namely, the wire 64 is a manually releasing part for manually releasing the lock by the electronic lock device 62. Even in the case where the lid 60 cannot be unlocked with the actuator of the electronic lock device 62, for some reason, the lock by the electronic lock device 62 can be released when the wire 64 is pulled.

Next, a method of attaching the cable module 10 to the vehicle body will be described. As shown in FIG. 10, a front inside panel 70 included in the vehicle body exists on the inner side of the front fender 50. As shown in FIG. 11, two projections 29 are provided on the lower surface of the base portion 24 of the cable module 10. Each of the projections 29 includes a snap-fit structure. In the process of attaching the cable module 10 to the vehicle body, the projections 29 are inserted into holes provided in the front inside panel 70, so that the retaining member 20 is fixed onto the front inside panel 70. At this stage, the cable member 30 is held in the first position.

Figure 12:
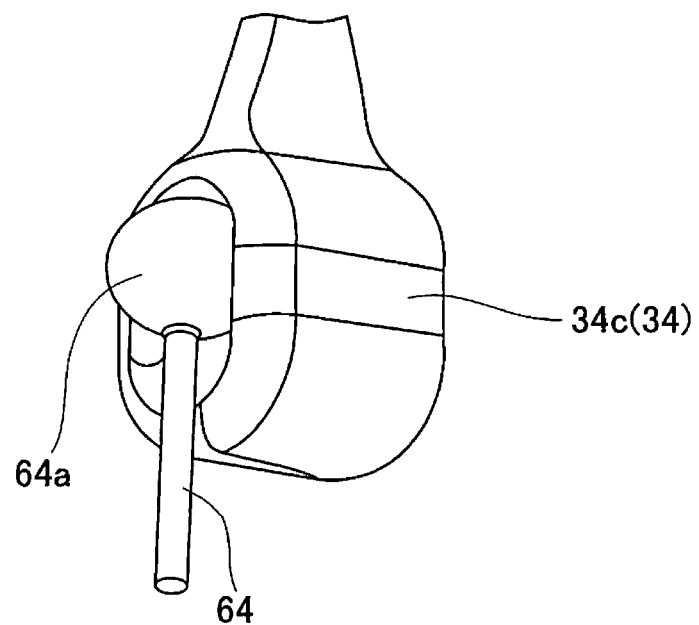
FIG. 12 is a view useful for describing operation to connect the cable with a wire.

Next, the wire 64 is connected to the cable 34, in a condition where the cable member 30 is set in the first position. As shown in FIG. 12, a spherical portion 64a is provided at a distal end of the wire 64. The spherical portion 64a is inserted into the coupling portion 34c of the cable 34, so that the wire 64 can be connected to the cable 34. Since the cable member 30 is set in the first position as described above, the length L (see FIG. 1) of the portion of the cable 34 that extends outward from the lower end 24x of the base portion 24 is long. Accordingly, the length of the cable 34 is sufficient enough to enable the operator to easily connect the wire 64 to the cable 34.

Next, the cable member 30 is moved to the second position, so that slack of the cable 34 is reduced. Namely, the cable member 30 is moved from the first position (i.e., the position shown in FIG. 1) to the second position (i.e., the position shown in FIG. 8), by the method as described above. Then, the length L (see FIG. 8) of the portion of the cable 34 that extends outward from the lower end 24x of the base portion 24 is reduced. As a result, slack of the cable 34 and the wire 64 is reduced.

As described above, according to the above production method, the cable 34 can be connected to the wire 64 in a condition where the cable 34 is sufficiently long, so that the operator can easily perform connecting operation. Then, the cable member 30 is moved to the second position, so that slack of the cable 34 can be reduced. Accordingly, the vehicle can be shipped out in a condition where slack of the cable 34 is reduced.

When the lock established by the electronic lock device 62 cannot be electrically released due to some abnormality during use of the vehicle, emergent release of the lock can be performed through manual operation. When the lock (namely, the lock of the lid 60) by the electronic lock device 62 is released through manual operation, the operator who conducts the manual operation can detach the grip portion 32 of the cable member 30 from the attaching portion 25, and pull the grip portion 32. As the grip portion 32 is pulled, the wire 64 is pulled via the cable 34, and the lock by the electronic lock device 62 is released. At this time, if slack of the cable 34 and the wire 64 is large, the operator of the manual operation cannot feel the tension when he/she pulls the grip portion 32, and it is difficult for the operator to determine whether the operation is performed properly. On the other hand, in the vehicle produced by the production method as described above, slack of the cable 34 and the wire 64 is small, and the operator of the manual operation can feel tension when pulling the grip portion 32. Also, since slack of the cable 34 and the wire 64 is small, the lock is released as the grip portion 32 is pulled by a small amount. Thus, the operator is prevented from becoming unsure about his/her own decision. Consequently, the operator can properly release the lock established by the electronic lock device 62.

Figure 13:
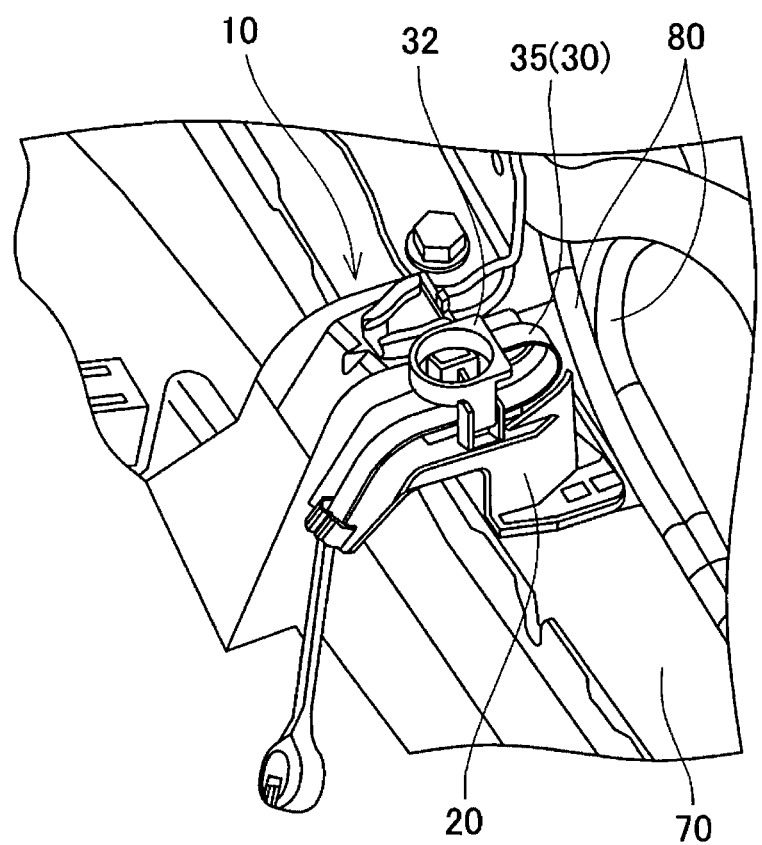
FIG. 13 is a perspective view of the cable module after it is attached to a vehicle body.

FIG. 13 shows a cable module 10 after it is attached to the vehicle body. As shown in FIG. 13, vehicle components including wiring 80, etc. are located around the front inside panel 70, and there is only small installation space for the cable module 10. However, in the cable module 10, the cable member 30 is fixed in a condition where it is bent at the intermediate portion 35; therefore, space occupied by the cable module 10 in the lateral direction is small. Thus, the cable module 10 can be attached to the vehicle body, without interfering with other vehicle components.

In the illustrated embodiment, the cable 34 is connected to the manually releasing part of the electronic lock device that locks the lid 60. However, when an electronic lock device that locks a connecting portion of the inlet and the charging connector is installed on the vehicle, the cable 34 may be connected to a manually releasing part of the electronic lock device that locks a connecting portion of the inlet and the charging connector.

While the embodiments have been described in detail, these are merely exemplary ones, and are not intended to limit the appended claims. The technologies described in the claims include various modifications of the specific examples illustrated above. The technical elements described in the specification or the drawings exhibit technical usefulness when used alone or in various combinations, and are not limited to the combinations described in the claims as filed. Also, the technologies illustrated in the specification or the drawings are supposed to achieve two or more objects at the same time, and have technical usefulness when achieving one of the objects.

What is claimed is:

1. A cable module, comprising:
a retaining member including a base portion, a guide portion, and an attaching portion; and
a cable member that is placed on the base portion, and includes a grip portion and a cable connected to the grip portion,
wherein the guide portion is provided on an upper surface of the base portion, and is configured to guide the cable such that the cable member slides relative to the base portion along a longitudinal direction of the cable,
wherein the attaching portion protrudes from the base portion,
wherein the retaining member is configured to retain the cable member in a first position and a second position,
wherein a length of an intermediate portion of the cable located between the guide portion and the grip portion, when the cable member is in the second position, is longer than that of the intermediate portion located between the guide portion and the grip portion when the cable member is in the first position, and
wherein, when the cable member is in the second position, the grip portion is attached onto the attaching portion in a condition where the intermediate portion is bent, and
wherein the cable module is connected to a manually releasing part of an electronic lock device.

2. The cable module according to claim 1, wherein the guide portion includes projections provided on the upper surface of the base portion, at positions on opposite sides of the cable.

3. The cable module according to claim 1, wherein, when the cable member is in the first position, the grip portion of the cable member is in contact with a side face of the attaching portion of the retaining member.

4. The cable module according to claim 1, wherein:
a pair of protrusions is provided on the upper surface of the base portion; and
when the cable member is in the second position, the intermediate portion that is bent is located between the pair of protrusions.

5. The cable module according to claim 4, wherein:
each of the protrusions includes an inclined face that is inclined to be closer to the upper surface of the base portion in a direction toward the guide portion; and
when the cable member is in the first position, the cable member is retained by the retaining member in a condition where the grip portion is in contact with the inclined face of each of the protrusions.

6. The cable module according to claim 1, wherein:
the guide portion includes an opposed portion that is opposed to an upper face of the cable; and
the upper face of the cable includes a first raised portion configured to pass the guide portion.

7. The cable module according to claim 6, wherein:
the upper face of the cable includes a second raised portion configured not to pass the guide portion; and
the second raised portion is located closer to a distal end of the cable than the first raised portion.

8. The cable module according to claim 7, wherein an amount of protrusion of the second raised portion from the upper face of the cable is larger than an amount of protrusion of the first raised portion from the upper face of the cable.

9. A vehicle including the cable module according to claim 1, the vehicle comprising:
a vehicle body;
an inlet;
a lid that covers the inlet; and
a power supply unit electronic lock device configured to lock the inlet or the lid,
wherein the retaining member is fixed to the vehicle body,
wherein the cable is connected to the manually releasing part of the power supply unit electronic lock device, and
wherein the retaining member retains the cable member in the second position.

10. A method of producing the vehicle according to claim 9, comprising:
fixing the retaining member to the vehicle body;
connecting the cable to the manually releasing part of the power supply unit electronic lock device, in a condition where the retaining member retains the cable member in the first position; and
moving the cable member from the first position to the second position by pulling the grip portion, after connecting the cable to the manually releasing part of the power supply unit electronic lock device.

11. The cable module according to claim 1, wherein the grip portion is directly attached to the attaching portion.

12. The cable module according to claim 1, wherein when the grip portion is attached to the attaching portion, the attaching portion is between the grip portion and the base.

13. The cable module according to claim 1, wherein when the grip portion is attached to the attaching portion, the cable extends above the attaching portion.

* * * * *